United States Patent [19]
Foust

[11] Patent Number: 5,804,948
[45] Date of Patent: Sep. 8, 1998

[54] SYSTEM FOR ZERO EMISSION GENERATION OF ELECTRICITY

[76] Inventor: John W. Foust, 125 Sarah Dr., Altoona, Pa. 16601

[21] Appl. No.: 772,923

[22] Filed: Dec. 24, 1996

[51] Int. Cl.$^6$ ..................................................... H02P 9/04
[52] U.S. Cl. ................................ 322/16; 322/13; 320/64
[58] Field of Search .............................. 320/64; 322/13, 322/16

[56] References Cited

U.S. PATENT DOCUMENTS

| | | |
|---|---|---|
| 1,275,201 | 8/1918 | Beach . |
| 4,042,056 | 8/1977 | Horwinski ........................... 180/65 A |
| 4,208,592 | 6/1980 | Leibow et al. ........................... 290/52 |
| 4,477,764 | 10/1984 | Pollard ..................................... 320/62 |
| 4,689,531 | 8/1987 | Bacon ..................................... 318/139 |
| 5,296,799 | 3/1994 | Davis ........................................ 322/35 |
| 5,578,911 | 11/1996 | Carter et al. ........................... 318/376 |
| 5,610,499 | 3/1997 | Rogers ..................................... 322/25 |

*Primary Examiner*—Steven L. Stephan
*Assistant Examiner*—Nicholas Ponomarenko
*Attorney, Agent, or Firm*—F. Tsung

[57] ABSTRACT

A zero emission generation system uses a direct current electric motor driving an electric generator to provide inverted alternating current to a load. The motor draws its electrical energy from two deep cycle direct current batteries, one or the other of which is alternatively switched into a motor drive circuit with the motor. The other of the two batteries is disposed in a recharge circuit which includes an alternator, mechanically powered by the direct current motor. Accordingly, while one battery is supplying power to the motor and generator, the other battery is being recharged towards capacity. A comptroller controls the switching between the two batteries and regulates recharging rates and extent by regulating the alternator field amperage draw and/or the alternator output to the charging circuit of the system. Further relays may be used to form a safety circuit to prevent both batteries from being removed from the motor drive circuit simultaneously. By switching the batteries between the motor drive circuit and the recharge circuit, the present system remains effective over a number of partial battery cycles, providing a sustained supply of electrical power to a load over a prolonged period of time. Further, such a system provides a built-in reserve should one or the other of the batteries become exhausted, inoperative, or otherwise require replacement.

11 Claims, 4 Drawing Sheets

SYSTEM FOR ZERO EMISSION GENERATION OF ELECTRICITY

BACKGROUND OF THE INVENTION

1. Field of the Invention

The present invention relates a system for providing electric power. More specifically, the present invention relates to emission-free electric power generation for extended periods without reliance on the consumption of fossil fuels.

2. Description of the Prior Art

Electric power is often desired at times and/or locations where a conventional outlet source is unavailable. In these situations, a system including a small fossil fuel engine coupled to a generator is typically used to provide the power. Unfortunately, such systems generate polluting emissions that are undesirable, and in some environments, prohibited. Further, to provide sufficient fuel for extended operations as well as to accommodate associated sub-systems such as for cooling, filtering, noise and/or mechanical dampening, such prior systems may become exceedingly bulky for easy transport and/or placement at a location desirous of electric power.

Various attempts have been made to provide low emission systems for generating electricity. For example, U.S. Pat. No. 4,208,592, issued Jun. 17, 1980 to B. Leibow et al. describes a compressed air power generating system where a part of the generated power output is used to recharge air source potential. U.S. Pat. No. 5,296,799, issued Mar. 22, 1994 to E. Davis describes a similar system, also utilizing compressed air. This system may use storage batteries charged by the generator to power an air compressor.

SUMMARY OF THE INVENTION

The present invention relates to a zero emission generation system that includes a direct current electric motor which drives an electric generator to provide inverted alternating current to a load. The motor draws its electrical energy from two deep cycle direct current batteries, one or the other of which is alternatively switched into a motor drive circuit with the motor. The other of the two batteries is disposed in a recharge circuit which includes an alternator, mechanically powered by the direct current motor. Therefore, as one battery is supplying power to the motor and generator, the other battery is being recharged towards capacity.

A comptroller is provided to control the switching between the two batteries and to regulate recharging rates and extent. By switching the batteries between the motor drive circuit and the recharge circuit, the present system remains effective over a number of partial battery cycles, providing a sustained supply of electrical power to a load over a prolonged period of time. Further, such a system provides a built-in reserve should one or the other of the batteries become exhausted, inoperative, or otherwise require replacement.

One or the other of the two batteries may be favored to provide a greater amount of the overall electrical energy in the system. In such implementations, the favored battery may be switched into the motor drive circuit through a "normally closed" type relay in series with the drive motor, and the other battery through a "normally open" type relay. Each of these relays when closed allows only it's associated battery to be placed in the motor drive circuit.

The comptroller further controls the recharging of each battery by regulating the alternator field amperage draw and/or the alternator output to the charging circuit of the system. Further relays may be used to form a safety circuit to prevent both batteries from being removed from the motor drive circuit simultaneously. Accordingly, it is a principal object of the invention to provide a system for generating alternating electrical power for a load without creating undesirable emissions.

It is another object of the invention to provide a dual battery system in which such power may be provided over an extended time lasting numerous partial battery cycles.

It is a further object of the invention to provide a power generating system with a minimum of moving parts.

Still another object of the invention is to provide a system in which an electronic comptroller is used to seamlessly direct and regulate battery usage/recharge rates to sustain extended power generation.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF A PREFERRED EMBODIMENT

Figure 1:
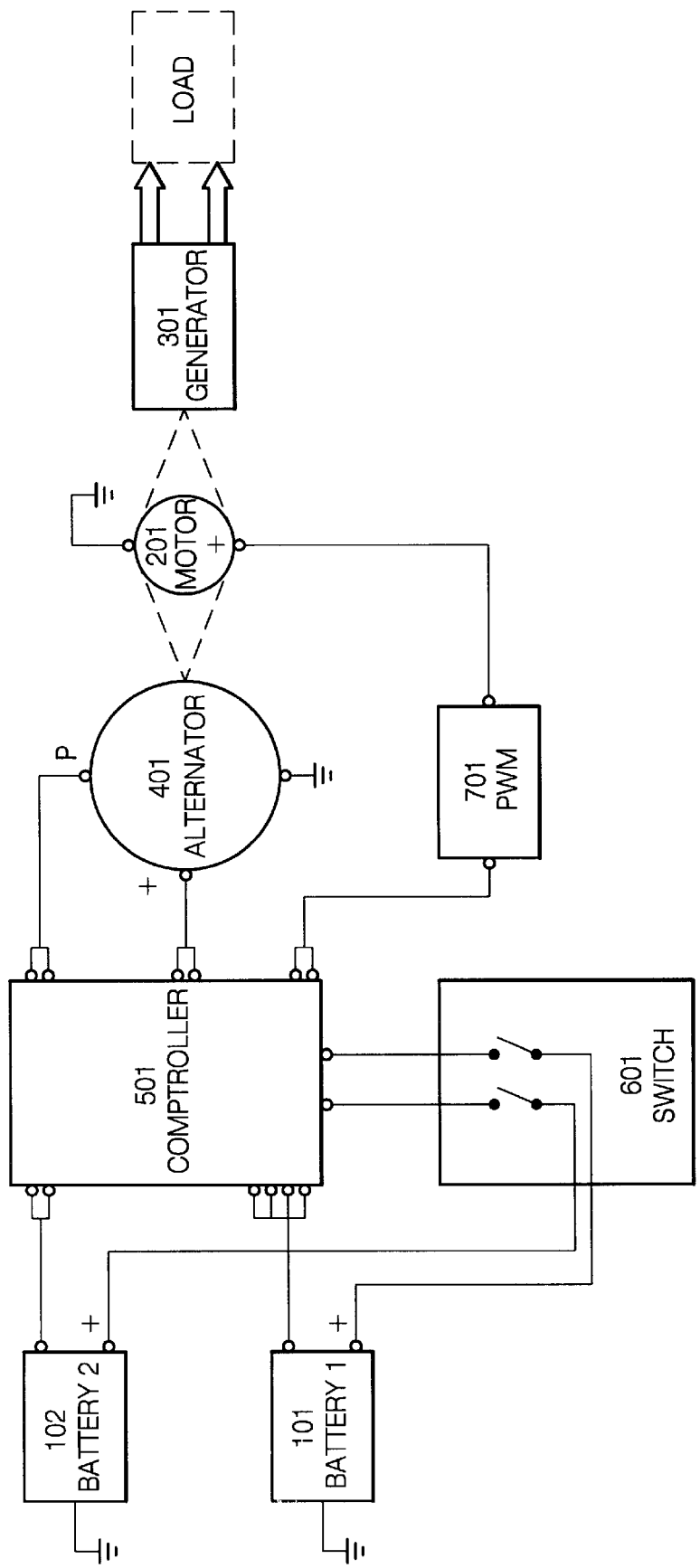
FIG. 1 is an general schematic view of one preferred embodiment of the present generation system.

The present invention shown in FIG. 1 includes two DC deep cycle batteries 101 and 102; an electric DC motor 201; a generator 301; an alternator 401; a comptroller 501; a main power switch 601; and a pulse width modulator 701.

Generator 301 provides AC current to a load, and is driven through a mechanical link to motor 201, the link here shown in broken lines. Preferably a self excited direct current generator which inverts the DC current into alternating current is used. Most preferably the output to load is an alternating current of 100 amps over from about 120 to about 220 volts. Generators which produce this output at a generator shaft rotation rate of 3600 RPM may be advantageously used in the present invention. The mechanical link between 201 and 301 may include gearing to achieve a given generator shaft rotation rate.

Alternator 401 is also driven through a mechanical link to motor 201. Advantageously, an alternator of standard automotive design may be used in the present invention. For example, one having a rectified 12 volt DC 90 amp output with approximately 3–5 amp draw is preferred. The alternator is used as the recharger to maintain battery condition at desired ratings.

The drive motor 201 is selected to both mechanically drive generator 301, as well as alternator 401. For a generator and alternator of the above preferred specifications, a ¼ horsepower 12 Volt DC series wind electric motor has been found effective.

Though 12 Volt examples will be cited herein, it should be understood that other voltages, including 24 VDC and 36 VDC may be used in the present system, so long as they are used throughout the system, including the motor, batteries, alternator, and in any voltage regulators used in the comptroller.

A pulse-width modulator 701 may be used to control the speed of motor 201. This reduces the risk of possible damage to the generator by excessive drive speeds and also helps to maintain generator output at desired levels. Together with motor 201 and modulator 701, the main power switch 601 forms the motor drive section of the present system. Switch 601 is preferably of a double pull single throw type. A 50 amp circuit breaker may also be included to protect the motor drive.

Batteries 101 and 102 are preferably selected which are capable of delivering sufficient amps to the drive motor to maintain operations for several hours without exhaustion. Most preferably, the batteries can deliver 40 amps to motor 201 for at least four hours without a drop in the batteries amp hour capacity below about 50 percent. 12 Volt DC deep cycle 1000 amp hour batteries may be used to meet these requirements.

Comptroller 501 provides the relays, regulators, and timer circuitry to effectively separate the present system into a motor drive circuit, in which only one of the batteries 101 and 102 is connected to provide power to motor 201; and a battery recharge circuit, in which the other of the batteries is electrically isolated from the motor drive circuit and may have its amp hour capacity replenished through alternator 401.

Figure 2:
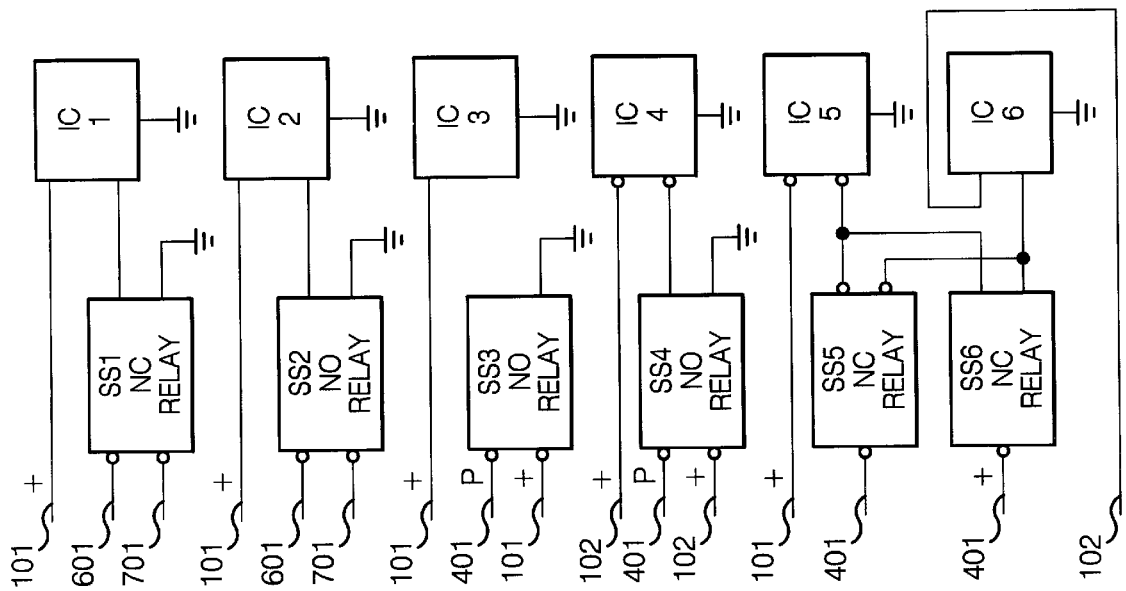
FIG. 2 is a partial detail schematic view of a comptroller section of the above generation system.
Figure 4:
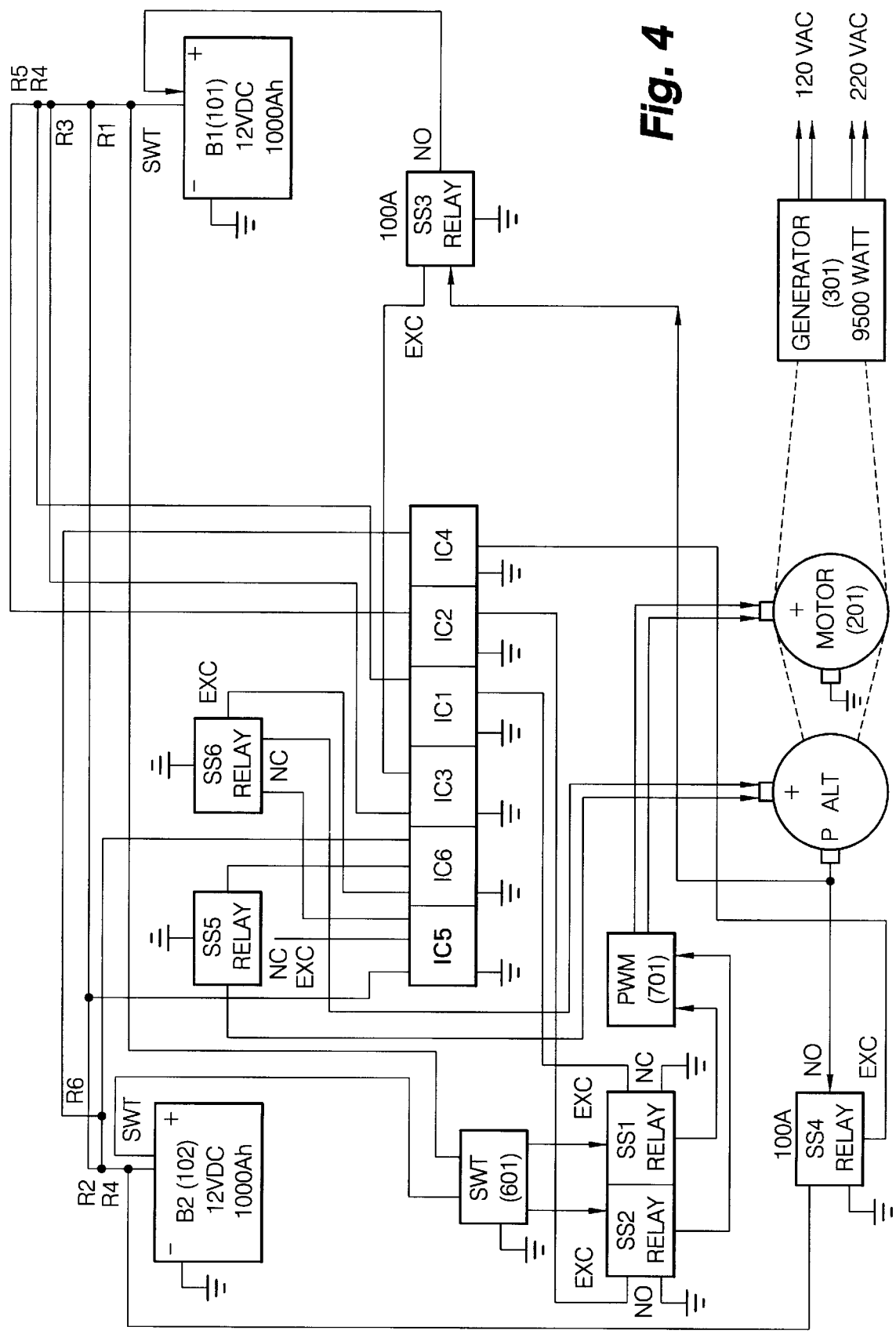
FIG. 4 is a schematic view of the embodiment of FIG. 1, with individual relays and connections shown.
Figure 5:
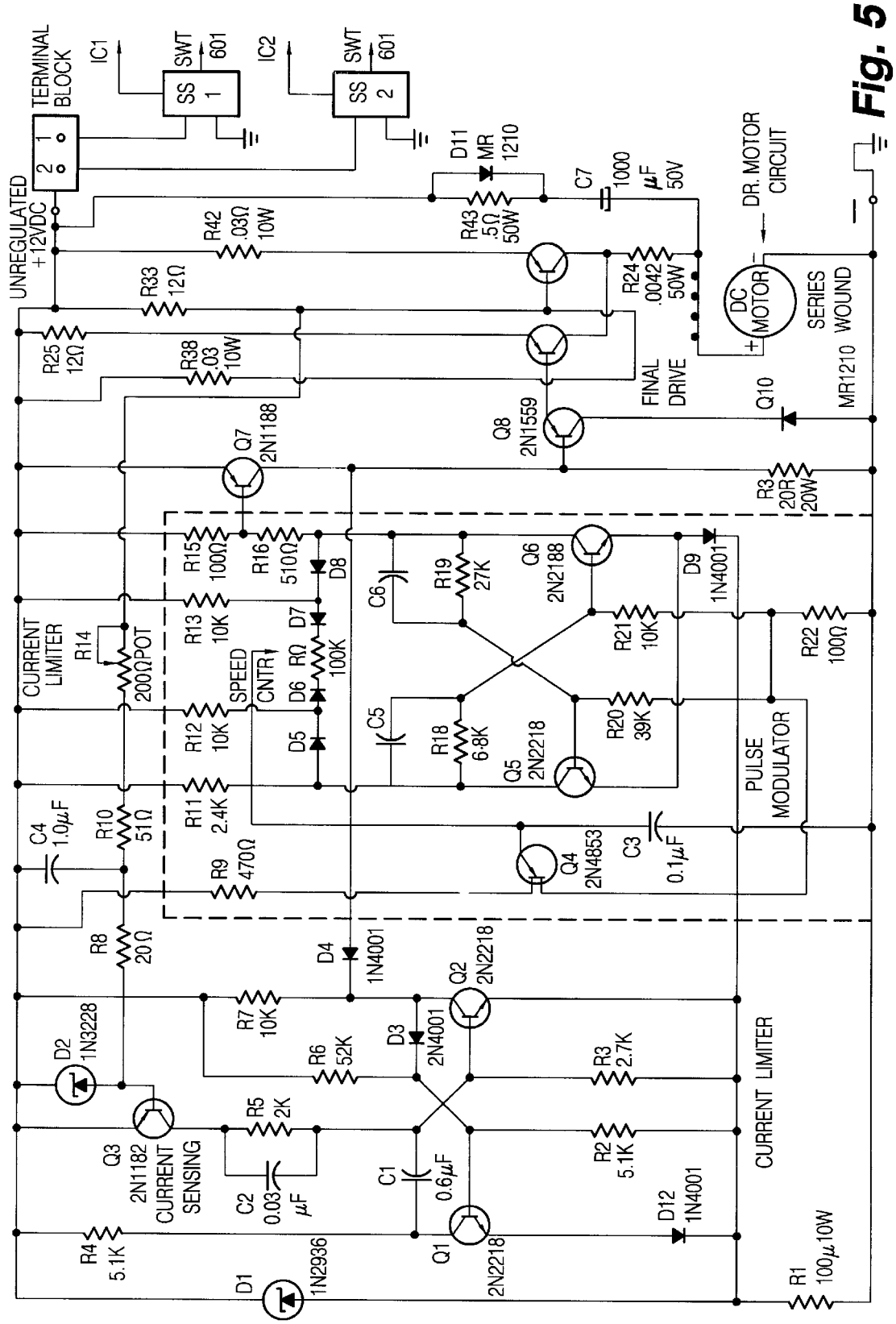
FIG. 5 is a schematic view showing details of a pulse width modulator useful in the present invention.

As best seen in FIG. 2, the comptroller may include a plurality of relays: SS1, SS2, SS3, SS4, SS5, and SS6; each activated through a regulator circuit: IC1, IC2, IC3, IC4, IC5, and IC6, respectively. Relay SS1 connects a first battery 101 to the motor drive circuit by connecting its lead from switch 601 to the pulse-width modulator (PWM) 701. This relay is preferably of the "Normally Closed" (NC) type. An associated regulatory circuit IC1 controls the relay based on a timer and/or the current directly from the positive terminal of battery 101. Upon activation, IC1 will open relay SS1, and Battery 101 will be removed from the motor drive circuit.

Relay SS2 connects a second battery 102 to the motor drive circuit when battery 101 is removed therefrom. As shown, a preferred configuration is of the "Normally Open" (NO) type, such that its regulatory circuit IC2 may also base controls on battery 101. Here, upon activation of IC2, relay SS2 closes, and current flows from the second battery 102 through the switch 601 to the PWM 701. Both relays SS1 and SS2 are most preferably have a from about 40 to about 50 amp rating.

Relay SS3 connects the first battery 101 directly to the power generating output 401p of generator 401, thereby placing the battery into the battery charging circuit. This provides for charging of the first battery upon activation of IC3 to close the NO type relay. Similarly, relay SS4 functions to connect second battery 102 to the generator at 401p upon activation of IC4. Both relays SS3 and SS4 are preferably of 100 amp rating.

Figure 3:
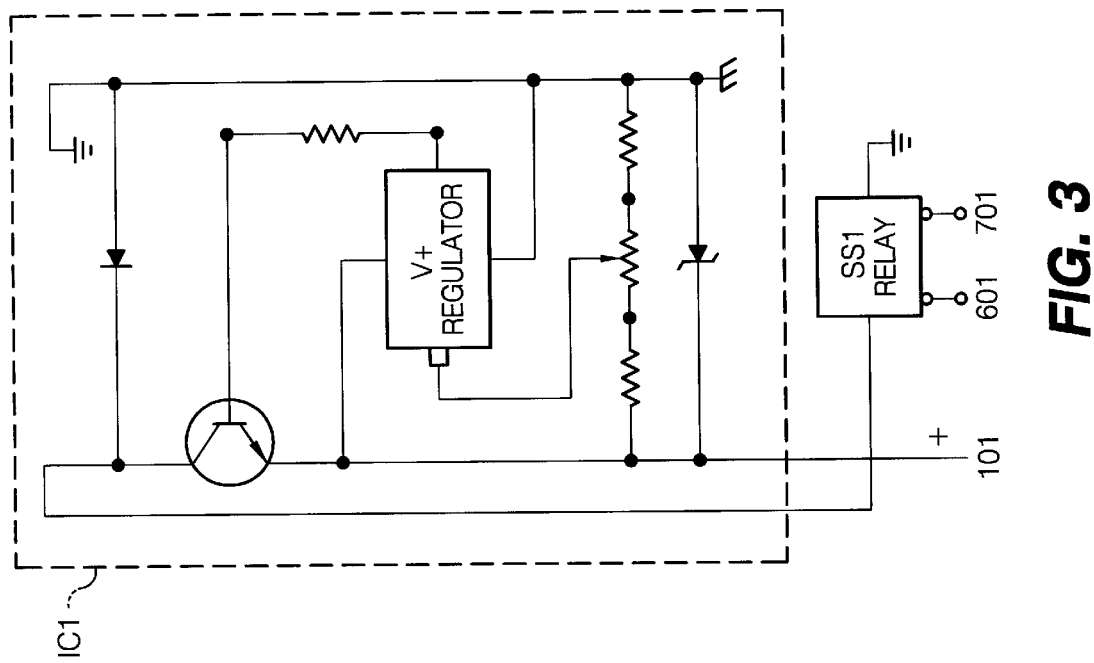
FIG. 3 is a partial detail schematic view of a regulator circuit and its associated relay, used in the above comptroller.

To prevent both battery 101 and battery 102 from simultaneously dropping out of the motor drive circuit, relays SS5 and SS6 are used to form a safety circuit. Using alternator fields as inputs for their regulator circuits IC5 and IC6, these NC type relays will open relays SS6 and SS5, respectively upon activation, thereby each preventing the other from calling for charge. Most preferably these relays are of the 10 amp rating. Regulator circuits IC5 and IC6 also control the alternator field amperage to provide the necessary output from the alternator 401, to their respective batteries 101 and 102. The various regulatory circuits may be of like construction, such as shown in FIG. 3 for Regulator circuit IC1.

It is to be understood that the present invention is not limited to the any single embodiment described above, but encompasses any and all embodiments within the scope of the following claims.

I claim:

1. A zero emission generation system for providing electrical power to a load over extended time periods, said system comprising:

a first deep cycle direct current battery;

a second deep cycle direct current battery;

a motor drive circuit;

a battery recharge circuit;

switching means for switching said first battery and said second battery between said motor drive circuit and said battery recharge circuit; such that at any given time, one of said first battery and said second battery is in said motor drive circuit, and the other is in said battery recharge circuit;

a comptroller for controlling said switching means and for regulating battery charging rate in said battery recharging circuit;

a single direct current electric motor provided in said motor drive circuit;

a main power switch provided in said motor drive circuit;

an alternator mechanically powered by said direct current electric motor, said alternator provided in said battery recharging circuit for recharging the battery in said battery recharge circuit; and a generator mechanically powered by said direct current electric motor, said generator providing alternating current to said load; and a pulse-width modulator in said motor drive circuit for controlling and maintaining a desired speed of rotation in a generator shaft of said generator.

2. The system of claim 1, wherein both said first battery and said second battery have the same voltage rating, and are selected from the group consisting of 12, 24, and 36 volt direct current batteries.

3. The system of claim 2, wherein said batteries have sufficient amp hour capacity to deliver 40 amps for 4 hours with no greater than about 50% reduction in said amp hour capacity.

4. The system of claim 3, wherein said batteries are 12 Volt direct current 1000 amp hour batteries.

5. The system of claim 1, wherein said main power switch further includes a circuit breaker to protect said drive motor in the event of an overload.

6. The system of claim 1, wherein said comptroller includes direct current voltage regulators to prevent undercharging and overcharging of the battery in the battery recharge circuit; relays to permit only one of the first battery and second battery to be placed in the motor drive circuit; and a timer circuit to control battery charging time.

7. The system of claim 6, wherein said first battery is maintained in said power drive circuit by a normally closed type relay, and said second battery by a normally open type relay such that said first battery provides a greater part of the system's operating electrical energy.

8. The system of claim 7, wherein said comptroller includes a first regulator circuit for opening said normally closed type relay; and a second regulator circuit for closing said normally open type relay, whereby activation of said first regulator circuit and said second regulator circuit places said second battery in said power drive circuit and said first battery in said recharge circuit.

9. The system of claim 1, wherein said generator outputs alternating current of about 120 to about 220 volts to power said load.

10. The system of claim 1, wherein said direct current motor is a 12 volt ¼ horse power output series wind motor.

11. The system of claim 1, wherein said alternator has a rectified 12 volt direct current 90 amp output, with from about three to about 5 amp draw, and is arranged in a delta configuration.

11. The system of claim 1, wherein said alternator has a rectified 12 vlt direct current 90 amp output, with from about three to about 5 amp draw, and is arranged in a delta configuration.

* * * * *